May 25, 1971   P. W. PIERCE   3,579,676
BEEHIVE
Filed April 16, 1969   2 Sheets-Sheet 1
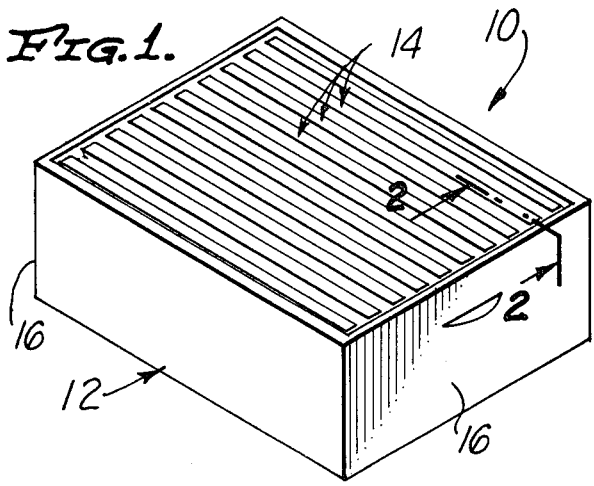
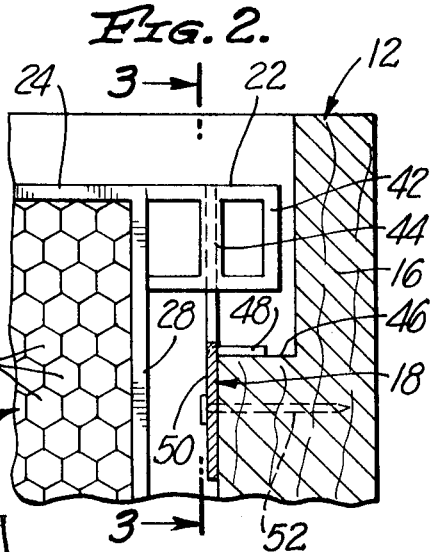
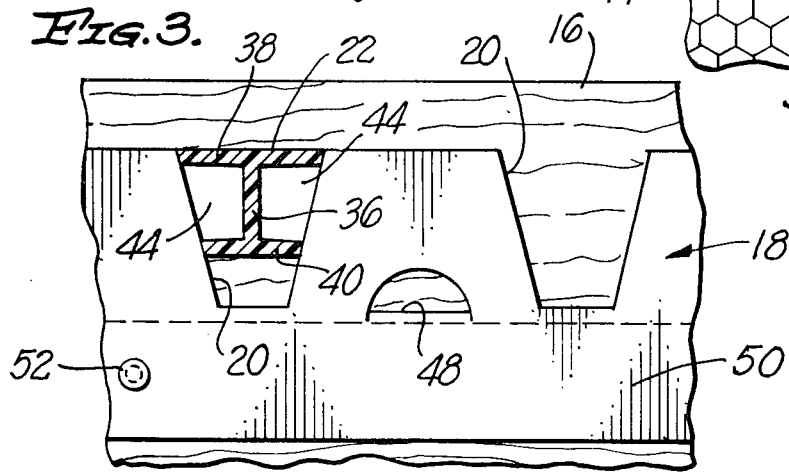
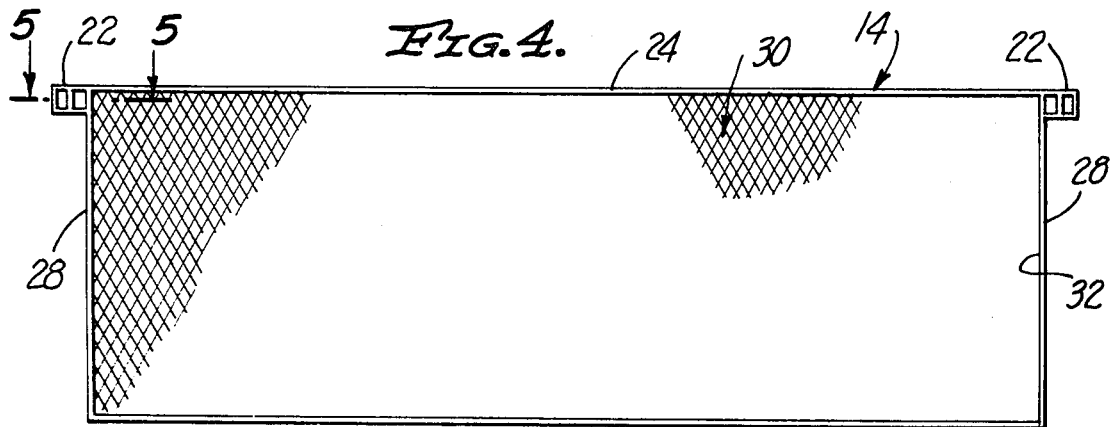
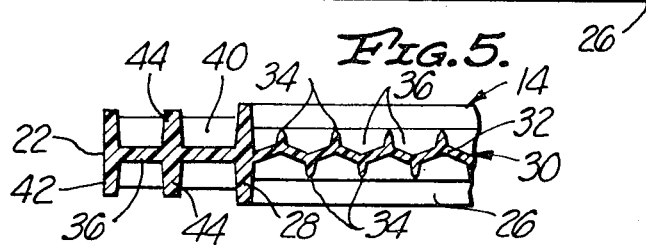
INVENTOR
PAUL W. PIERCE
BY
Boniard I. Brown
ATTORNEY May 25, 1971 P. W. PIERCE 3,579,676
BEEHIVE
Filed April 16, 1969 2 Sheets-Sheet 2
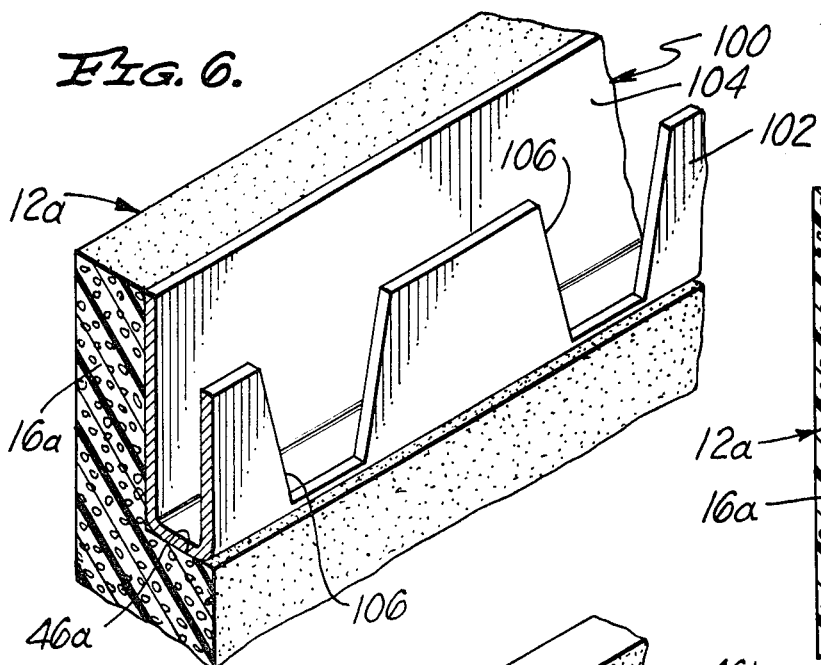
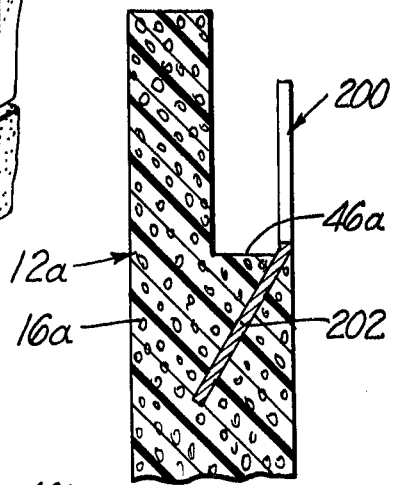
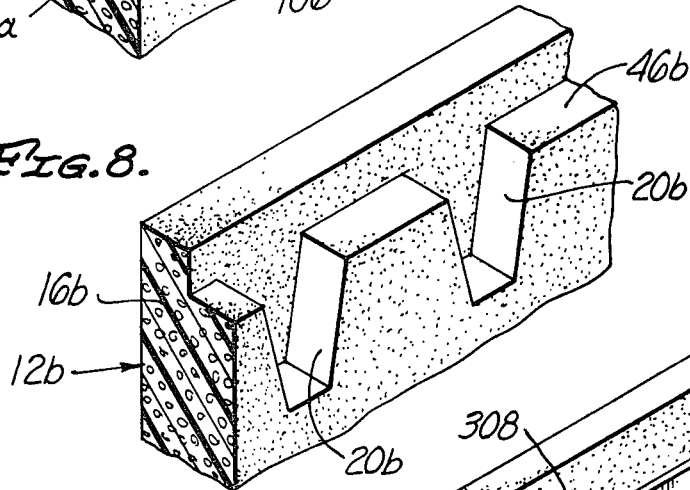
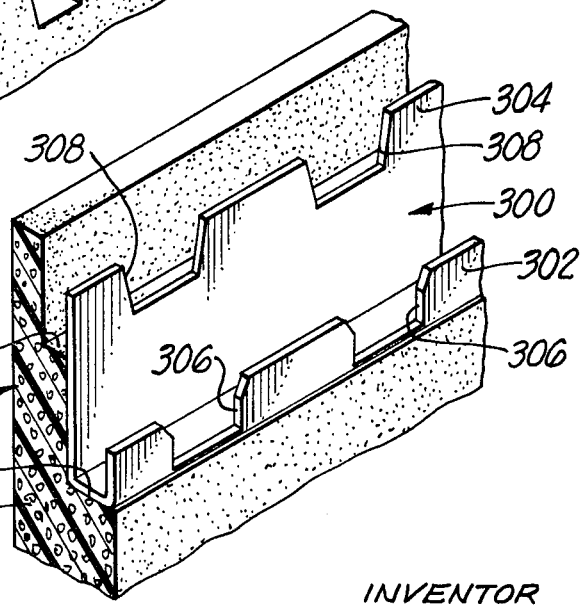
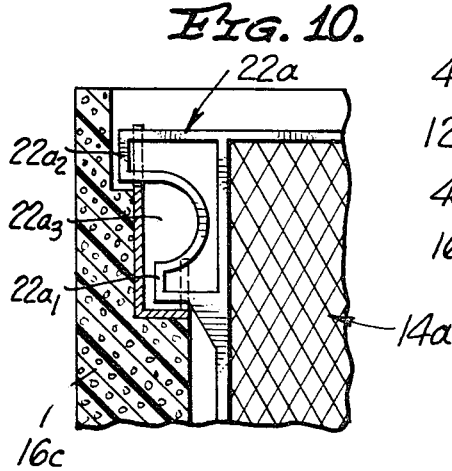
INVENTOR
PAUL W. PIERCE
BY
Boniard I. Brown
ATTORNEY

United States Patent Office 3,579,676
Patented May 25, 1971

3,579,676
BEEHIVE
Paul W. Pierce, 1630 W. 9th St., Upland, Calif. 91786
Filed Apr. 16, 1969, Ser. No. 816,679
Int. Cl. A01k 47/02
U.S. Cl. 6—2     10 Claims

ABSTRACT OF THE DISCLOSURE

A bee frame and a super for a beehive. The bee frame is a unitary molded plastic structure including a permanent, molded plastic comb foundation characterized by a novel cellular configuration and integrally joined to the frame bars in such a way as to condition the frame to support the weight of a honeycomb for an extended period of time without warping and to permit machine uncapping of the comb. The super has notched frame supports of novel configuration for supporting a number of bee frames in laterally spaced side by side relation to provide an optimum spacing between adjacent frames and permit handling and transportation of a hive containing bees and honeycomb without damage to the bees or honeycomb.

BACKGROUND OF THE INVENTION

Field of the invention

This invention relates generally to the bee-keeping art. More particularly, the invention relates to a novel unitary molded plastic bee frame with an integral molded plastic permanent comb foundation and to a novel super for supporting a number of the frames in laterally spaced relation.

Prior art

A typical beehive embodies a number of bee frames and an outer body or box, referred to as a super, for supporting the frames in vertical side by side relation. Each bee frame has four frame bars joined end to end in an open rectangular configuration defining a central rectangular opening. Supported within this opening is a rectangular sheet, referred to as a comb foundation or simply a foundation, having hexagonal cellular formations which simulate the cells of a honeycomb. This foundation is generally made with beeswax and forms a base on which bees construct honeycombs to be filled with honey or to serve as brood cells. Projecting from the ends of the frame along the axis of the top frame bar are ears which are adapted to engage frame supports on two opopsing walls of the super. For convenience of description, the bee frame and foundation are collectively referred to in this disclosure as a bee frame.

In use of a beehive, a number of bee frames are supported side by side in vertical planes within a super and the hive is placed in a location suitable to brooding or honey production, as the case may be. A hive used for honey production is periodically transported to a processing plant where the honeycomb cells are uncapped and the honey removed.

The existing beehives are characterized by various deficiencies which the present invention overcomes. A major deficiency of the existing beehives resides in the construction of their bee frames. The more commonly used bee frame, for example, has wooden frame bars which tend to warp and deteriorate with age. As a consequence, these frames must be frequently repaired and replaced. The frames also tend to be somewhat costly. Moreover, the wooden frame bars of the existing bee frames are required to be quite large in cross section, and thus results in a bee frame which is relatively heavy, in order to provide the frame with sufficient strength to support a honeycomb whose weight is on the order of six pounds. Even with such large frame bars, however, the existing wooden bee frames are quite often warped or otherwise deformed by the weight of the honeycombs when the latter are left on the hives for an extended period of time.

Another disadvantage of the existing bee frames resides in the fact that the thick top bar of one super plus the fairly thick bottom bar of the super sitting above it make a substantial barrier to the workings of the beehive. The bees greatly resent this gap in their combs coming from top to bottom of the hives. As will appear from the ensuing description, the present invention provides a beehive having thin plastic frames which reduces this gap to approximately one-third the distance of the wooden frame gap. As a consequence, bees start to work much more quickly in the supers.

Another disadvantage of the existing beehives resides in the fact that the existing bee frames are designed to be placed side by side within a super, ten frames to a super, in such a way that the edges of the vertical end frame bars on adjacent bee frame abut to locate the frames laterally relative to one another and to the super. The upper end portions of the end frame bars are made substantially wider than the lower end portions of these bars and the top and bottom frame bars so as to provide clearance spaces between adjacent bee frames through which bees may enter and leave the honeycombs. As most bee-keepers recognize, however, the spacing which is then provided between adjacent bee frame is less than the ideal spacing for optimum honey production. That is to say, experience has proven that bees tend to swarm less and provide more honey with fewer frames in a super. For example, it has been found that nine frames per super is better. For this reason, most bee-keepers place but nine frames in a single super.

This method of providing the proper spacing between adjacent bee frames has several disadvantages. First, the frames are not restrained against relative lateral movement during handling and transportation of the hives from one location to another. As a consequence, numbers of bees are generally crushed between the frames as the latter move back and forth during handling and transit. Secondly, the width of the side frame bars exceeds the normal honeycomb thickness with the result that these bars project beyond the outer sides of the honeycombs. The bars thus interfere with machine uncapping of the combs so that the latter frequently must be uncapped by hand. Such manual comb uncapping, however, is comparatively time-consuming and costly. Further, because the bee frames are not positively located relative to one another, the frame spacing is generally not uniform. As a result, the honeycombs frequently sag which, together with the warping of the wooden frames, complicates machine uncapping of the combs. Another disadvantage resides in the fact that when a bee-keeper wishes to draw new combs, he must place ten frames in a super to assure even spacing between the frames and thereby prevent the bees from drawing the combs between the frames.

When a bee-keeper places a super of wooden frames containing empty combs on top of a beehive to be filled with honey, he has to space the nine combs evenly by hand and by eyesight. This presents two disadvantages. First, it is a time-consuming process. Secondly, it requires the hives to be open for an extended period of time and often causes serious robbing by the bees and demoralizes the apiary. In the present invention, the supers are merely set on top of the hives and the cover is placed in position.

SUMMARY OF THE INVENTION

The present invention provides an improved bee frame and super for a beehive which avoid the above noted and

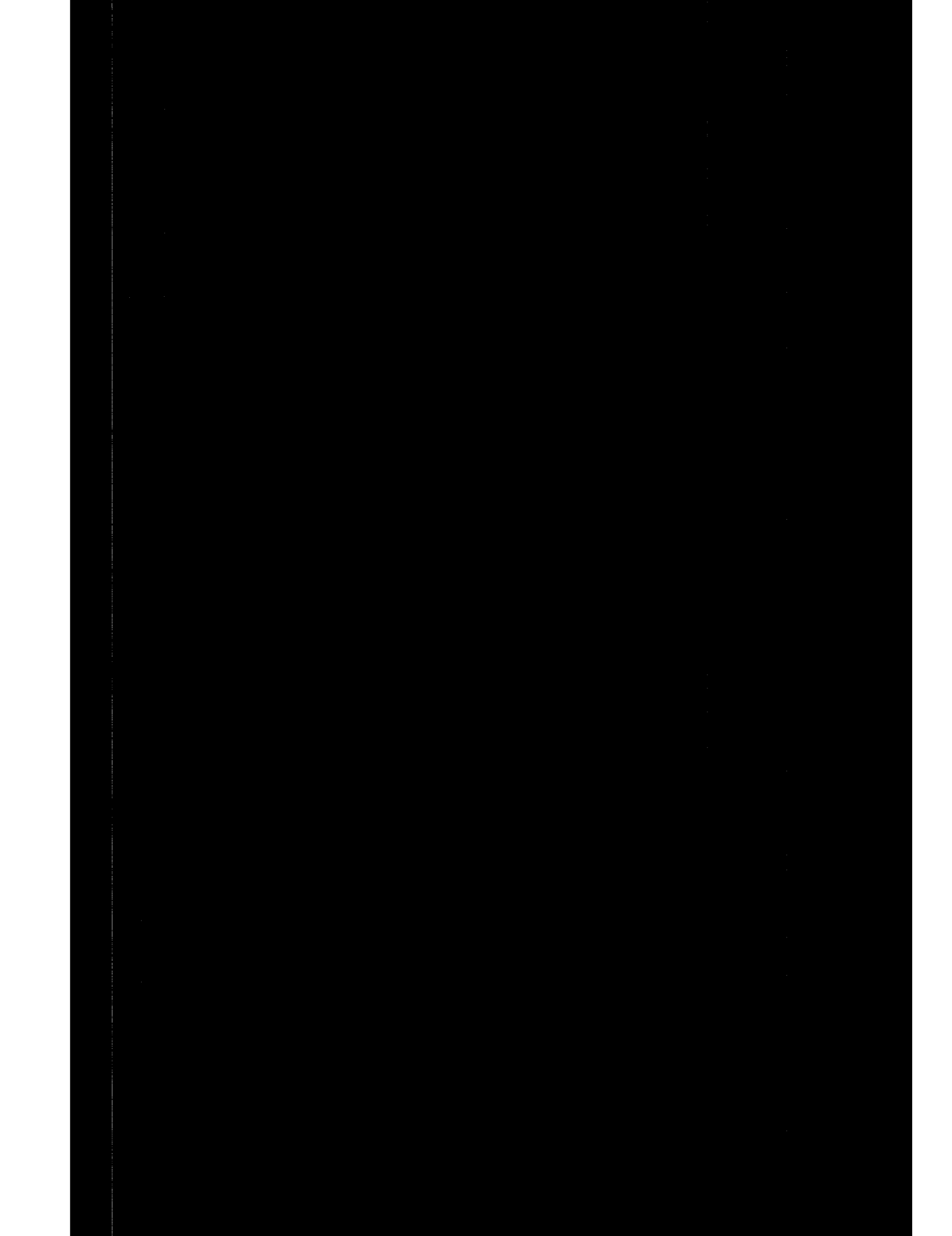

opposite end walls 16 provided with bee frame supports or hanger brackets 18. The particular super 12 illustrated in FIGS. 1 through 3 is assumed to be constructed of wood. The inner sides of the super end walls 16 are recessed adjacent their upper edges to provide these walls with inner, upwardly presented shoulders 46. The illustrated frame supports or hanger brackets 18 comprise metal plates which are notched at intervals to define the frame ear receiving notches 20. As shown best in FIG. 3, these notches are tapered at the same angle as the frame ears 22 and are laterally dimensioned to receive these ears to a depth such that the upper ear flanges 38 are substantially flush with the upper edges of the hanger plates. Between certain adjacent ear notches 20, the hanger plates 18 are slotted and then bent inwardly to provide tongues 48 for resting on the super end wall shoulders 46. These tongues are located a distance above the lower edges of the hanger plates so as to provide these plates with lower flange leg portions 50 for seating against the inner surfaces of the super end walls below their shoulders 46, in the manner illustrated best in FIG. 2. The hanger plates are secured to the end walls in any convenient way, as by driving nails 52 through the lower plate flange portions 50 into the walls.

It will now be understood that the bee frames 14 are placed within the super 12 in such a way that the ears 22 on each frame engage in aligned notches of the bee frame hanger brackets 18. The ears seat within these notches to a depth at which the upper ear flanges 38 are flush with the upper edges of the hanger brackets. This snug fit of the frame ears within the bracket flanges not only serves to support the bee frames 14 vertically, but also to position the bee frames laterally relative to one another at both their upper and lower edges. In this regard, it should be noted that the notches 20 in the bee frame hanger brackets 18 are located to provide the ideal spacing between the adjacent bee frames 14. As shown in FIG. 2, the central frame ear ribs 44 are placed so that these ribs are located in the planes of the frame hanger brackets 18 when the bee frames 14 are placed within the super. These central ear ribs obviously provide the frame ears 22 with maximum strength in the regions of their supporting contact with the frame hanger brackets 18. Since the bee frames 14 are positively located relative to one another, there is no possibility of these frames moving together during handling or transportation of the beehive. The possibility of honey bees being crushed between adjacent frames during handling or shipment, therefore, is eliminated.

It will be recalled that an important feature of the invention resides in the fact that the midrib 32 of the bee frame core foundation 30 and the central longitudinal ribs 42 of the frame ears 22 are all located in the central plane of symmetry of the bee frame 14. This provides effective transfer of the weight of the bee frame and honeycombs on the frame from its comb foundation 30 to the super end walls 36. In other words, since the midrib of the foundation and the central ribs of the frame ears are located in a common plane, the weight of the honeycombs produces no twisting moments on the ears or other parts of the bee frame and the honeycomb weight is transferred directly from the foundation and the frame ears to the super end walls.

Prior to use, each bee frame 14 is coated with beeswax, in the usual way. The coated bee frames are then inserted into the super 12 and the latter is covered in a conventional manner to allow bees to construct honeycombs on the frames. Periodically, the supers are transported to a processing plant where the frames are removed and the honeycombs uncapped to permit removal of the honey from the comb cells. As noted earlier, a major advantage of the present invention resides in the fact that the honeycombs may be uncapped by machine. When necessary, the bee frames 14 can be cleaned and rewaxed without damage to the frames, owing to their plastic construction. This ability to clean and rewax the frames any number of times without harm to the frames obviously constitutes a distinct advantage of the invention. Another particularly important advantage of the invention resides in the fact that the comb foundation 30 is permanently attached about its entire perimeter to the bee frame bars 24, 26, 28. As a consequence, there is no possibility of this foundation buckling or warping under the weight of honeycombs on the foundation.

FIG. 6 illustrated a modified bee frame hanger bracket 100 according to the invention which is particularly suited for use on a molded plastic super 12a constructed of foam or other suitable plastic material. In this case, the bracket has a generally channel shape in transverse cross section and includes laterally spaced inner and outer flanges 102, 104. The bracket is cemented or otherwise firmly secured in position on top of the super end wall shoulder 46a in such a manner that the outer flange 104 covers the end wall above the shoulder to prevent honey bees from eating through the plastic end wall. The inner flange 102 is formed with V notches 106 for receiving the bee frame ears 22. It will be understood that each end wall will be provided with such a hanger bracket.

FIG. 7 illustrates a modified bee frame hanger bracket 200 for a molded plastic super 12a. Hanger plate 200 has a lower portion 202 which is bent outwardly at a small angle and is embedded in the plastic end wall 16a of the super 12a below the end wall shoulder 46a. The upper portion of the hanger plate is exposed above the shoulder and is notched to receive the bee frame ears 22. Here again, it will be understood that the opposite end wall of the super will be provided with a similar hanger plate.

In FIG. 8, there is illustrated a molded plastic super 12b whose end walls 16b (only one shown) are formed with bee frame ear receiving notches 20b. These notches are molded directly in the super end walls and open upwardly through the end wall shoulders 46b. These shoulders are located at a somewhat higher elevation than they are in the other embodiments of the invention.

FIGS. 9 and 10 illustrate a further modified bee frame hanger arrangement which reduces the vertical movement required to elevate the bee frame ears from and replace the ears in the hanger bracket notches. This form of the invention is particularly adaptable for use with deep frames which require a stronger support. In this case, each super end wall 16c has a pair of shoulders $46c_1$, $46c_2$ located one above the other. Cemented or otherwise secured to each super end wall above and in seating contact with the lower end wall shoulder $46c_1$ is a modified bee frame hanger bracket 300 of channel shape in transverse cross section. Each bracket has an inner flange 302 of given height relative to the lower shoulder $46c_1$ and an outer flange 304 which projects to the same height above the upper shoulder $46c_2$. These flanges have aligned notches 306, 308, respectively, for receiving the ears 22a on modified bee frames 14a. The frame ears 22a have lower portions $22a_1$ which engage in the lower hanger notches 306 and upper portions $22a_2$ which engage in the upper hanger notches 308, as shown best in FIG. 10. To this end, the upper portion $22a_2$ of each frame ear 22a projects outwardly beyond the lower portion $22a_1$ of each ear in the manner illustrated in FIG. 10. The outer ends of the frame ears are shaped to provide finger recesses or openings $22a_3$ through which the bee-keeper may insert his fingers for lifting the bee frames from and reinserting the frames into the super.

The primary advantage of the bee frame hanger arrangement of FIGS. 9 and 10 resides in the fact that the hanger bracket notches 306, 308 may be substantially reduced in depth compared to the ear receiving notches in the other forms of the invention without adversely affecting the lateral stability or positioning of the bee